(12) United States Patent
Ullmann et al.

(10) Patent No.: US 12,381,015 B2
(45) Date of Patent: Aug. 5, 2025

(54) LOWER END FITTING LOCATING PINS

(71) Applicant: BWXT mPower, Inc., Charlotte, NC (US)

(72) Inventors: Julius M. Ullmann, Forest, VA (US); Lewis A. Walton, Forest, VA (US); Mary W. Johnson, Amherst, VA (US)

(73) Assignee: BWXT mPower, Inc., Charlotte, NC (US)

( * ) Notice: Subject to any disclaimer, the term of this patent is extended or adjusted under 35 U.S.C. 154(b) by 0 days.

(21) Appl. No.: 17/690,306

(22) Filed: Mar. 9, 2022

(65) Prior Publication Data

US 2022/0199269 A1  Jun. 23, 2022

Related U.S. Application Data

(62) Division of application No. 13/786,505, filed on Mar. 6, 2013, now Pat. No. 11,289,209.

(Continued)

(51) Int. Cl.
*G21C 3/33* (2006.01)
*G21C 3/12* (2006.01)
(Continued)

(52) U.S. Cl.
CPC .............. *G21C 3/326* (2013.01); *G21C 3/12* (2013.01); *G21C 3/3305* (2013.01); *G21C 5/06* (2013.01); *G21C 1/32* (2013.01); *Y02E 30/30* (2013.01)

(58) Field of Classification Search
CPC ........ G21C 3/326; G21C 3/3305; G21C 3/12; G21C 5/06
See application file for complete search history.

(56) References Cited

U.S. PATENT DOCUMENTS 3,382,153 A * 5/1968 Bigge .................... G21C 3/328
                                                  376/400
3,669,834 A * 6/1972 Klumb ................... G21C 15/02
                                              976/DIG. 188

(Continued)

FOREIGN PATENT DOCUMENTS

CN        89100731        9/1989
CN       1906703 A        1/2007
(Continued)

OTHER PUBLICATIONS

Extended European Search Report dated Nov. 12, 2015 for European Application No. 13797747.6.

(Continued)

*Primary Examiner* — Lily C Garner
(74) *Attorney, Agent, or Firm* — Nelson Mullins Riley & Scarborough LLP (57) ABSTRACT

A nuclear reactor has a core installed on a lower core plate and formed from multiple fuel assemblies, each fuel assembly including a structural cage assembly. The structural cage assembly has an upper end fitting, mid grids, and a lower end fitting (LEF). The LEF positions the fuel assembly using four locating pins located at each corner of the LEF. The pins position the fuel assembly laterally by mating with receiving holes in the lower core plate. The locating pins have a chamfered tip with a flat end. The chamfered tip allows for a greater positioning margin when installing the fuel assembly in the core by guiding the pins into holes in the lower core plate, and the flat tip provides strength and stability in case the assembly is inadvertently rested on the tip of the pin instead of the LEF pads.

12 Claims, 6 Drawing Sheets

Related U.S. Application Data (60) Provisional application No. 61/625,285, filed on Apr. 17, 2012.

(51) Int. Cl.
    *G21C 3/326* (2006.01)
    *G21C 5/06* (2006.01)
    *G21C 1/32* (2006.01)

(56) References Cited

U.S. PATENT DOCUMENTS

| | | | |
|---|---|---|---|
| 3,770,583 A | 11/1973 | Klumb et al. | |
| 3,819,477 A * | 6/1974 | Fromel | G21C 3/3408 |
| | | | 376/441 |
| 3,928,126 A * | 12/1975 | Seim | G21C 3/3305 |
| | | | 376/202 |
| 3,968,008 A * | 7/1976 | Piepers | G21C 3/32 |
| | | | 976/DIG. 59 |
| 3,971,575 A | 7/1976 | Lesham et al. | |
| 3,992,259 A * | 11/1976 | Anthony | G21C 3/331 |
| | | | 376/440 |
| 4,006,055 A * | 2/1977 | Knodler | G21C 13/02 |
| | | | 976/DIG. 102 |
| 4,030,975 A * | 6/1977 | Anthony | F16B 39/02 |
| | | | 376/442 |
| 4,127,445 A | 11/1978 | Anthony | |
| 4,192,716 A | 3/1980 | Anthony | |
| 4,298,434 A | 11/1981 | Anthony et al. | |
| 4,309,251 A | 1/1982 | Anthony et al. | |
| 4,333,798 A * | 6/1982 | Anthony | G21C 3/326 |
| | | | 976/DIG. 63 |
| 4,560,532 A * | 12/1985 | Barry | G21C 3/3305 |
| | | | 376/444 |
| 4,664,874 A * | 5/1987 | Shallenberger | G21C 3/334 |
| | | | 376/261 |
| 4,675,151 A * | 6/1987 | Leclerco | G21C 5/06 |
| | | | 976/DIG. 102 |
| 4,684,495 A * | 8/1987 | Wilson | G21C 3/3305 |
| | | | 376/439 |
| 4,684,496 A * | 8/1987 | Wilson | G21C 3/32 |
| | | | 376/439 |
| 4,820,479 A * | 4/1989 | Hornak | G21C 3/12 |
| | | | 976/DIG. 102 |
| 4,832,905 A * | 5/1989 | Bryan | G21C 3/322 |
| | | | 210/488 |
| 4,885,127 A | 12/1989 | Yokoyama | |
| 4,895,698 A | 1/1990 | DeMario | |
| 4,900,507 A | 2/1990 | Shallenberger | |
| 4,923,669 A | 5/1990 | DeMario | |
| 4,957,697 A | 9/1990 | Wada | |
| 4,960,561 A | 10/1990 | Gerard et al. | |
| 4,966,745 A | 10/1990 | Widener et al. | |
| 4,990,304 A | 2/1991 | Rylatt | |
| 4,994,233 A | 2/1991 | Freeman | |
| 4,996,018 A | 2/1991 | Bhatt et al. | |
| 4,996,021 A | 2/1991 | Bryan | |
| 5,009,837 A | 4/1991 | Nguyen et al. | |
| 5,024,806 A | 6/1991 | Cioffi et al. | |
| 5,030,413 A * | 7/1991 | Knierriem | G21C 5/06 |
| | | | 976/DIG. 102 |
| 5,037,605 A | 8/1991 | Riordan, III | |
| 5,043,134 A | 8/1991 | Widener et al. | |
| 5,068,083 A | 11/1991 | John, Jr. et al. | |
| 5,071,617 A | 12/1991 | Bryan | |
| 5,094,802 A | 3/1992 | Riordan, III | |
| 5,135,710 A * | 8/1992 | Grattier | G21C 3/32 |
| | | | 376/310 |
| 5,158,740 A | 10/1992 | Boatwright | |
| 5,207,980 A * | 5/1993 | Gilmore | G21C 3/12 |
| | | | 376/364 |
| 5,265,137 A | 11/1993 | Busch | |
| 5,268,948 A | 12/1993 | Church et al. | |
| 5,282,231 A | 1/1994 | Adams et al. | |
| 5,282,233 A | 1/1994 | Bryan | |
| 5,299,246 A | 3/1994 | Bryan | |
| 5,367,549 A | 11/1994 | Hatfield | |
| 5,436,945 A | 7/1995 | Weisel et al. | |
| 5,513,234 A | 4/1996 | Rottenberg | |
| 5,640,434 A | 6/1997 | Rottenberg | |
| 5,661,766 A * | 8/1997 | McClelland | G21C 17/06 |
| | | | 33/549 |
| 6,055,288 A | 4/2000 | Schwirian | |
| 6,088,420 A | 7/2000 | Yokoyama et al. | |
| 6,130,927 A | 10/2000 | Kang et al. | |
| 6,275,557 B2 | 8/2001 | Nylund et al. | |
| 6,310,931 B1 * | 10/2001 | Gustafsson | G21C 5/06 |
| | | | 376/451 |
| 6,442,227 B1 * | 8/2002 | Iacovino, Jr. | G21C 19/07 |
| | | | 376/327 |
| 6,636,578 B1 | 10/2003 | Clark | |
| 6,636,580 B2 | 10/2003 | Murakami et al. | |
| 6,810,099 B2 | 10/2004 | Nakamaru et al. | |
| 6,819,733 B2 | 11/2004 | Broders et al. | |
| 6,865,242 B2 | 3/2005 | Barbe et al. | |
| 6,895,067 B2 | 5/2005 | Borum et al. | |
| 6,943,315 B2 * | 9/2005 | Cho | B23K 37/0235 |
| | | | 219/86.7 |
| 7,085,340 B2 | 8/2006 | Goldenfield et al. | |
| 7,257,185 B1 | 8/2007 | Yamada et al. | |
| 7,280,946 B2 | 10/2007 | Russell, II et al. | |
| 7,424,412 B2 | 9/2008 | Kropaczek et al. | |
| 7,428,479 B2 | 9/2008 | Boer et al. | |
| 7,453,972 B2 | 11/2008 | Hellandbrand, Jr. et al. | |
| 7,526,058 B2 | 4/2009 | Fawcett et al. | |
| 7,548,602 B2 | 6/2009 | Smith, III et al. | |
| 7,561,654 B2 | 7/2009 | Makovicka et al. | |
| 7,574,337 B2 | 8/2009 | Kropaczek et al. | |
| 7,577,229 B2 * | 8/2009 | Chambrin | G21C 5/06 |
| | | | 376/442 |
| 7,668,280 B2 | 2/2010 | Hellandbrand, Jr. et al. | |
| 7,668,284 B2 | 2/2010 | Sparrow et al. | |
| 7,856,076 B2 * | 12/2010 | Labarriere | G21C 3/3305 |
| | | | 376/451 |
| 9,715,946 B2 * | 7/2017 | Kurzer | G21C 3/331 |
| 10,124,472 B2 * | 11/2018 | Ullmann | F16B 39/025 |
| 11,289,209 B2 | 3/2022 | Ullmann et al. | |
| 2003/0123600 A1 | 7/2003 | Hesketh et al. | |
| 2003/0169839 A1 | 9/2003 | Matteson | |
| 2005/0069080 A1 | 3/2005 | Goldenfield et al. | |
| 2006/0153327 A1 | 7/2006 | Jiang | |
| 2006/0222140 A1 | 10/2006 | Aleshin et al. | |
| 2006/0251205 A1 * | 11/2006 | Balog | G21C 3/331 |
| | | | 376/362 |
| 2007/0133732 A1 | 6/2007 | Nakayama et al. | |
| 2007/0183556 A1 * | 8/2007 | Labarriere | G21C 3/3305 |
| | | | 376/440 |
| 2007/0206717 A1 | 9/2007 | Conner et al. | |
| 2008/0084957 A1 | 4/2008 | Aleshin et al. | |
| 2009/0032178 A1 | 2/2009 | Feinroth | |
| 2010/0316181 A1 | 12/2010 | Thome et al. | |
| 2011/0164719 A1 * | 7/2011 | Aleshin | G21C 19/307 |
| | | | 376/313 |
| 2011/0280361 A1 * | 11/2011 | Rudolph | G21C 3/3305 |
| | | | 376/399 |
| 2013/0272477 A1 * | 10/2013 | Ullmann | G21C 3/3206 |
| | | | 376/440 |
| 2013/0272479 A1 * | 10/2013 | Lee | G21C 3/3305 |
| | | | 376/440 |
| 2013/0272480 A1 | 10/2013 | Ullmann et al. | |

FOREIGN PATENT DOCUMENTS

| | | | | |
|---|---|---|---|---|
| CN | 102272857 A * | 12/2011 | | G21C 3/3305 |
| EP | 2341509 A2 * | 7/2011 | | G21C 19/307 |
| EP | 2405443 A1 * | 1/2012 | | G21C 3/33 |
| FR | 2864323 A1 * | 6/2005 | | G21C 3/32 |
| JP | 2011050987 A | 3/2011 | | |
| KR | 20100048086 A | 5/2010 | | |

(56) References Cited

FOREIGN PATENT DOCUMENTS

WO          WO-9840894 A1 *   9/1998   .............. G21C 3/12
WO          2006119140 A1    11/2006

OTHER PUBLICATIONS

First Office Action dated Feb. 19, 2016 for Chinese Application No. 201380031772.5.
Second Office Action for Chinese Application No. 201380031772.5 dated Oct. 27, 2016.
The International Search Report and Written Opinion for PCT/US2013/029323, dated Nov. 5, 2013.

* cited by examiner

LOWER END FITTING LOCATING PINS

CROSS-REFERENCE TO RELATED APPLICATIONS

This application is a Division of U.S. patent application Ser. No. 13/786,505 filed on Mar. 6, 2013, now U.S. Pat. No. 11,289,209, which claims the benefit of U.S. Provisional Application No. 61/625,285 filed Apr. 17, 2012, the disclosures of which are hereby incorporated by reference in their entirety.

BACKGROUND

The following relates to the nuclear reactor arts, nuclear power generation arts, nuclear reactor hydrodynamic design arts, and related arts.

In nuclear reactor designs of the integral pressurized water reactor (integral PWR) type, a nuclear reactor core is immersed in primary coolant water at or near the bottom of a pressure vessel. In a typical design, the primary coolant is maintained in a subcooled liquid phase in a cylindrical pressure vessel that is mounted generally upright (that is, with its cylinder axis oriented vertically). A hollow cylindrical central riser is disposed concentrically inside the pressure vessel. Primary coolant flows upward through the reactor core where it is heated and rises through the central riser, discharges from the top of the central riser and reverses direction to flow downward back toward the reactor core through a downcomer annulus defined between the pressure vessel and the central riser. In the integral PWR design, at least one steam generator is located inside the pressure vessel, typically in the downcomer annulus. Some illustrative integral PWR designs are described in Thome et al., "Integral Helical-Coil Pressurized Water Nuclear Reactor", U.S. Pub. No. 2010/0316181 A1 published Dec. 16, 2010 which is incorporated herein by reference in its entirety. Other light water nuclear reactor designs such as PWR designs with external steam generators, boiling water reactors (BWRs) or so forth, vary the arrangement of the steam generator and other components, but usually locate the radioactive core at or near the bottom of a cylindrical pressure vessel in order to reduce the likelihood of air exposure of the reactor core in a loss of coolant accident (LOCA).

The nuclear reactor core is built up from multiple fuel assemblies. Each fuel assembly includes a number of fuel rods. Spaced vertically along the length of the fuel assembly are grid assemblies which provide structural support to the fuel rods. At the top and bottom of the fuel assembly are an upper end fitting and a lower end fitting. The lower end fitting, sometimes called a nozzle plate, is supported by a lower core support plate (or more simply "core plate"), support pedestals, or the like. In some reactor designs, the primary coolant flow rate is high enough to cause lifting of the fuel assemblies, in which case a structure above the reactor core provides a stop or limiter that limits the lifting of the fuel assemblies.

The lower end fitting is the entrance (i.e., inlet nozzle) for coolant flow into the fuel assembly. The fuel assembly also includes guide tubes interspersed amongst the fuel rods. Control rods comprising neutron absorbing material are inserted into and lifted out of the guide tubes of the fuel assembly to control core reactivity. The guide tubes are welded to the grid assemblies and secured to upper and lower end fittings to form the structural support for the fuel assembly.

The current design of the bottom of many nuclear fuel assemblies consists of a female receptacle which engages a male counterpart on the core plate. This mating positions the fuel assembly during installation, and holds the fuel assembly in its proper position during reactor operation. Disclosed herein are improvements that provide various benefits that will become apparent to the skilled artisan upon reading the following.

BRIEF DESCRIPTION

In one embodiment, nuclear fuel assembly comprises: a set of fuel rods comprising fissile material; a structural cage comprising guide tubes welded with spacer grids that holds the set of fuel rods; an upper end fitting secured to the top of the structural cage; and a lower end fitting secured to the bottom of the structural cage, the lower end fitting including a plate with primary coolant flow channels and a plurality of locating pins extending from the bottom surface of the plate.

In another embodiment, a nuclear reactor comprises: a pressure vessel; a nuclear reactor core including a plurality of nuclear fuel assemblies as set forth in the immediately preceding paragraph; and a lower core plate supporting the nuclear reactor core inside the pressure vessel, the lower core plate supporting each fuel assembly by the lower end fitting of the nuclear fuel assembly, the lower core plate having holes arranged to receive the locating pins of the lower end fittings of the nuclear fuel assemblies to laterally align the nuclear fuel assemblies on the lower core plate.

In another embodiment, a lower end fitting of a fuel assembly of a nuclear reactor includes: a plate having flow channels to allow reactor primary coolant water to flow through the plate and having a bottom surface that includes a plurality of raised support pads, and a plurality of locating pins extending from the bottom surface of the plate.

In another embodiment, a method comprises: supporting a nuclear reactor fuel assembly comprising fissile material by raised support pads formed on a bottom surface of a lower end fitting of the nuclear reactor fuel assembly; and laterally aligning the nuclear reactor fuel assembly by locating pins extending downward from the bottom surface of the lower end fitting of the nuclear reactor fuel assembly. In some embodiments the method does not include supporting the nuclear reactor fuel assembly using the locating pins. In some embodiments the supporting comprises supporting the nuclear reactor fuel assembly on a lower core plate of a nuclear reactor, and the method further comprises simultaneously performing the supporting and lateral aligning for a set of nuclear reactor fuel assemblies making up a nuclear reactor core in order to support and align the nuclear reactor core on the lower core plate of the nuclear reactor.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION

Figure 1:
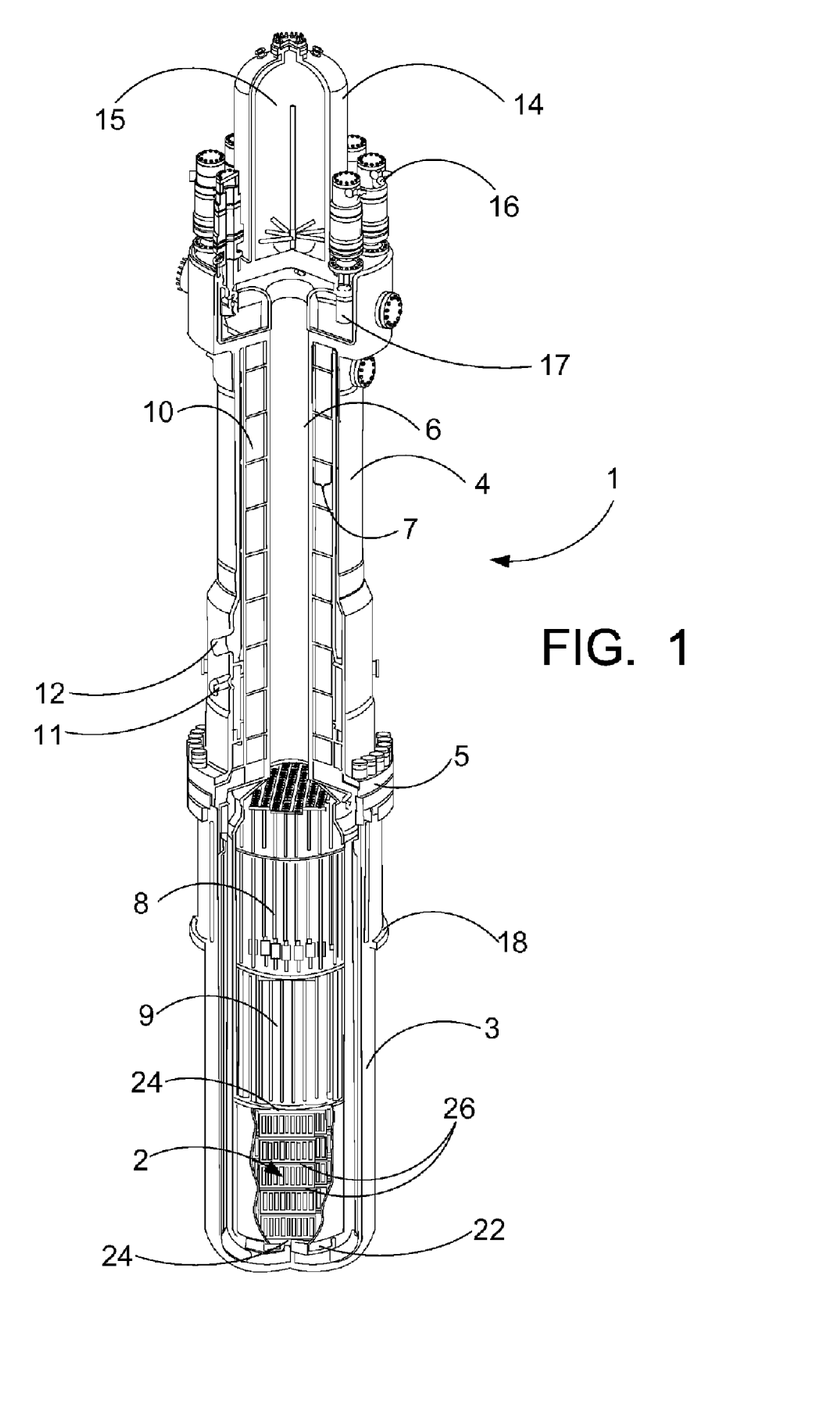
FIG. 1 diagrammatically shows a perspective partial sectional view of an illustrative nuclear reactor of the pressurized water reactor (PWR) variety with internal steam generators (integral PWR).

With reference to FIG. 1, an illustrative nuclear reactor 1 of the pressurized water reactor (PWR) variety is shown. The illustrative PWR 1 includes a nuclear reactor core 2 disposed in a pressure vessel which in the illustrative embodiment comprises a lower vessel portion 3 and an upper vessel portion 4 connected by a mid-flange 5. The reactor core 2 is disposed in the lower vessel portion 3, and comprises a fissile material (e.g., $^{235}$U) immersed in primary coolant water. A cylindrical central riser 6 is disposed coaxially inside the cylindrical pressure vessel and a downcomer annulus 7 is defined between the central riser 6 and the pressure vessel. The illustrative PWR 1 includes internal control rod drive mechanisms (internal CRDMs) 8 that control insertion of control rods to control reactivity; however, the reactor can alternatively employ external CRDMs. In either case, guide frame supports 9 guide the translating control rod assembly (e.g., each including a set of control rods comprising neutron absorbing material yoked together by a spider and connected via a connecting rod with the CRDM). The illustrative PWR 1 employs internal steam generators 10 located inside the pressure vessel, but embodiments with the steam generators located outside the pressure vessel (i.e., a PWR with external steam generators) are also contemplated. The illustrative steam generators 10 are of the once-through straight-tube type with internal economizer, and are fed by a feedwater inlet 11 and deliver steam to a steam outlet 12. The illustrative PWR 1 includes an integral pressurizer 14 at the top of the upper vessel section 4 which defines an integral pressurizer volume 15; however an external pressurizer connected with the pressure vessel via suitable piping is also contemplated. The primary coolant in the illustrative PWR 1 is circulated by reactor coolant pumps (RCPs) comprising in the illustrative example external RCP motors 16 driving an impeller located in a RCP casing 17 disposed inside the pressure vessel. The illustrative PWR 1 also includes an optional support skirt 18. It is to be appreciated that the PWR 1 is merely an illustrative example—the disclosed lower end fitting and pins are suitably employed in substantially any type of PWR as well as in nuclear reactors of other types such as boiling water reactor (BWR) designs. The nuclear reactor core 2 is comprised of fuel assemblies 20 and rests on a lower core plate 22 that may be suspended from the mid-flange 5, supported in the lower vessel portion 3, or otherwise supported. The fuel assemblies are each held together by end grids 24 and mid grids 26, shown in more detail in FIG. 2.

Figure 2:
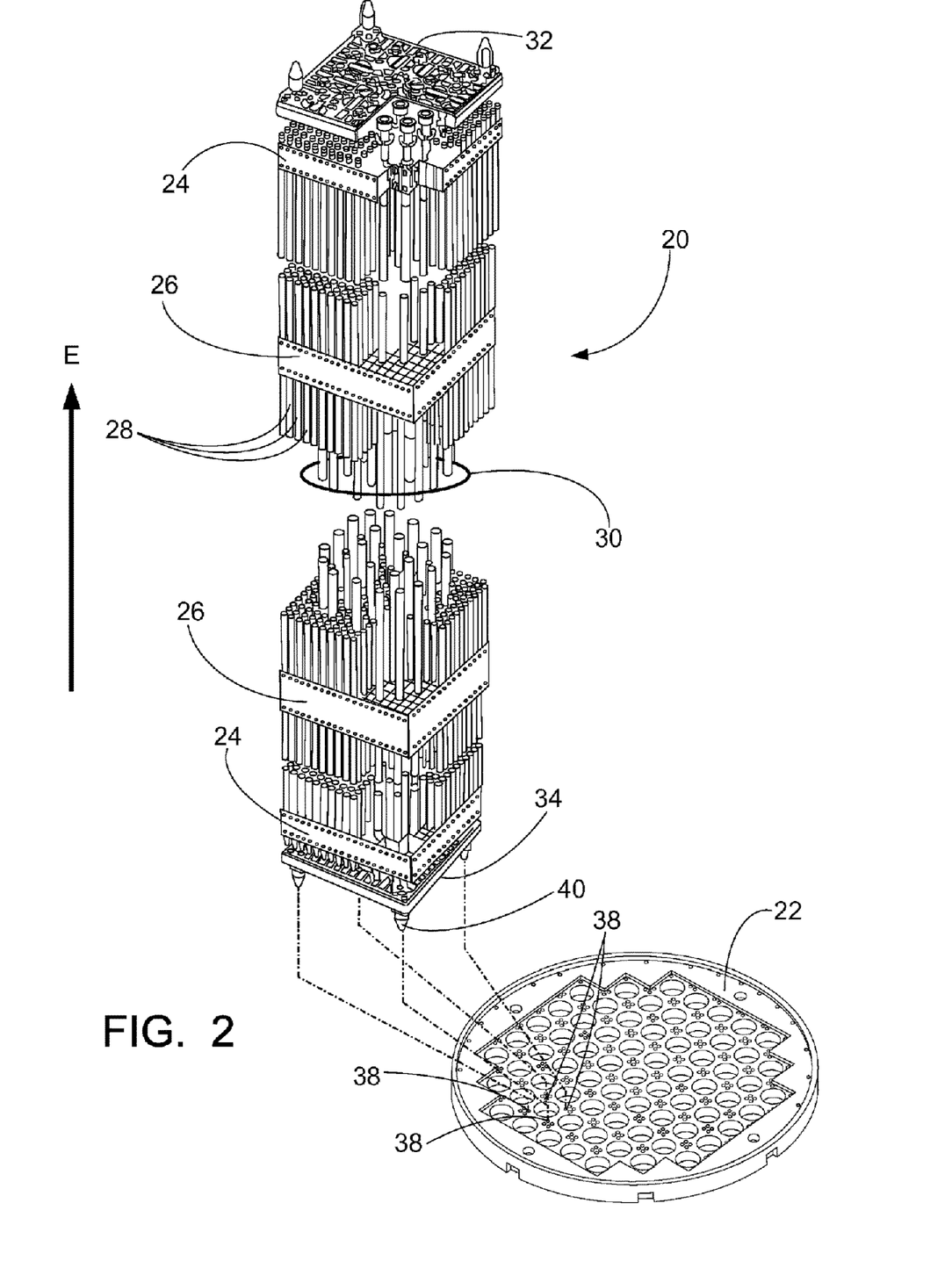
FIG. 2 diagrammatically shows a perspective view of one of the fuel assemblies of the nuclear reactor core of the nuclear reactor of FIG. 1 and a portion of the lower core plate of the nuclear reactor.

With reference to FIG. 2, a representative fuel assembly 20 is diagrammatically shown with partial breakaway and the front top corner of the perspective view cut away to reveal internal components. The fuel assembly 20 is suitably employed as an element of the nuclear reactor core 2 disposed in the pressure vessel of FIG. 1. The fuel assembly 20 includes an array of vertically oriented fuel rods 28 each comprising a fissile material such as $^{235}$U. For example, each fuel rod may contain enriched uranium dioxide ($UO_2$) or mixed $UO_2$/gadolinium oxide ($UO_2$—$Gd_2O_3$) pellets. Interspersed amongst the fuel rods 28 are guide tubes 30 that provide conduits for control rods, instrumentation, or so forth. The top of the fuel assembly 20 is terminated by an upper end fitting 32 (sometimes referred to as a nozzle) and the bottom of the fuel assembly 20 is terminated by a lower end fitting (LEF) 34 (also sometimes referred to as a nozzle). The vertical direction of the fuel assembly 20 is denoted as the vertical or "elevation" direction E in FIG. 2.

The fuel assembly 20 is held together by a plurality of spacer grids including end grids 24 disposed near the top and bottom of the fuel assembly 20 and one or (typically) more mid-grids 26 disposed at spaced apart positions between the top and bottom of the fuel assembly 20. (Said another way, each end spacer grid 24 is closer to an end of the bundle of fuel rods 28 than the mid-grid 26). Illustrative FIG. 2 shows only two mid-grids 26, but typically additional mid-grids are present which are omitted in the cutaway illustration. The number of mid-grids, and the spacing of the end grids and mid grids along the height of the fuel assembly, is determined based on the total length of the bundle of fuel rods, the total number of fuel rods in the bundle, the structural characteristics of the fuel rods, applicable regulatory requirements, and so forth. As indicated diagrammatically in FIG. 1, the grids 24, 26 of all fuel assemblies typically are vertically aligned with each other so that any contact between adjacent fuel assemblies is grid-to-grid contact. (Such uniformity among the fuel assemblies is also advantageous from a manufacturing standpoint).

Also shown in FIG. 2 is a portion of the core plate 22, shown diagrammatically using dashed lines. The core plate 22 includes openings 38 arranged to receive locating pins 40 disposed on the bottom of the lower end fitting 34, as described in further detail in the following. In the view of FIG. 2, the fuel assembly 20 is positioned above the core plate 22, e.g., as when the fuel assembly 20 is lowered into position during installation, so that the locating pins 40 are laterally aligned with, but not yet inserted into, the receiving openings 38 of the core plate 22.

Figure 3:
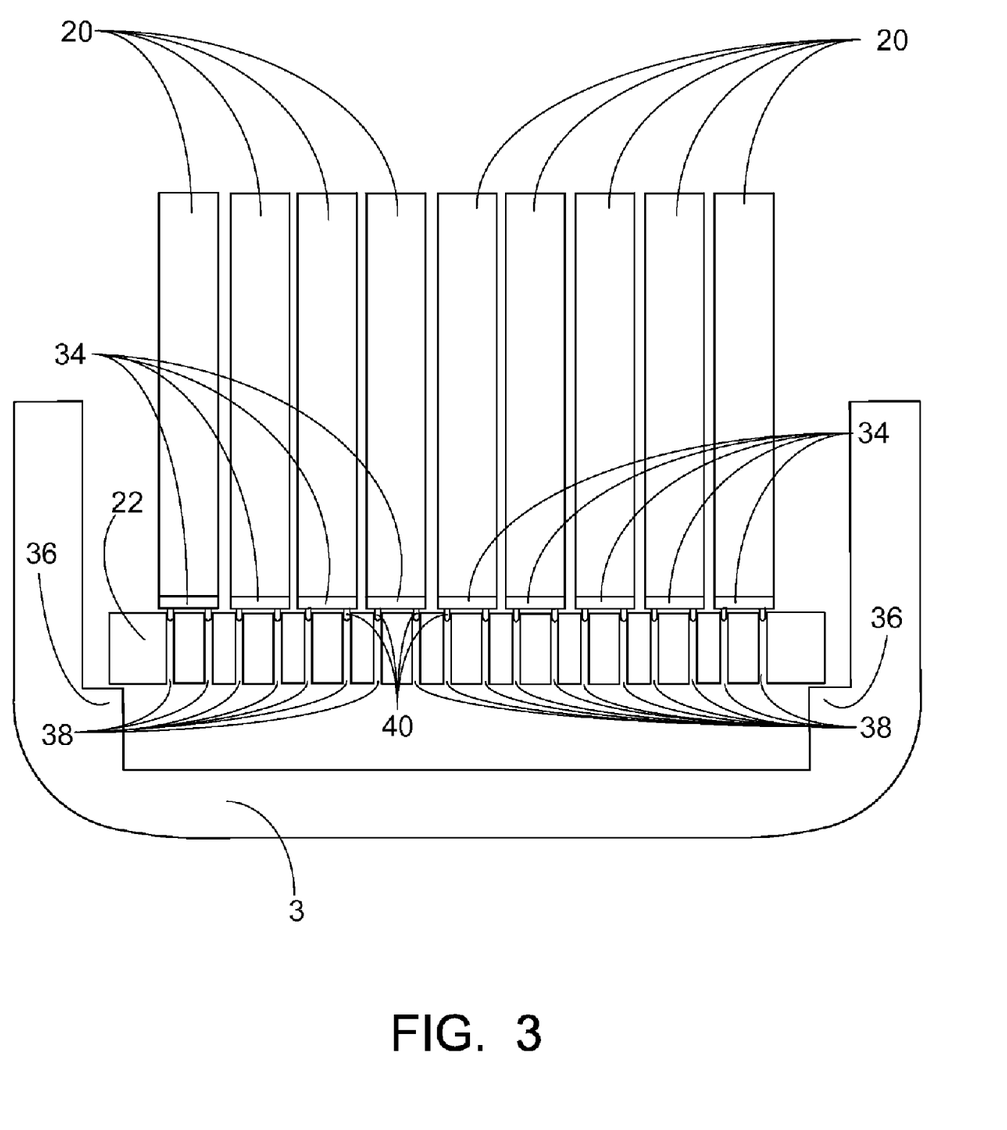
FIG. 3 is a cutaway diagram of the lower end of the nuclear reactor of FIG. 1.

With reference to FIG. 3, cutaway views of fuel assemblies 20 installed on the core plate 22 are diagrammatically depicted. In the illustrative example, the core plate 22 is supported by a mount 36 or pedestal of the lower vessel portion 3, although other reactor core support configurations such as suspension from the mid-flange 5 are also contemplated. Each fuel assembly includes a lower end fitting 34 which contacts the core plate 22. In the embodiment shown, each lower end fitting 34 has locating pins 40 (four of the eighteen pins are labeled 40) to prevent lateral movement of the fuel assembly. As the diagram is in cutaway, only two of the pins are visible on each fuel element; however, each square fuel element has four pins—one at each corner. In other embodiments, more or fewer pins are contemplated and different shapes of fuel elements are contemplated, such as hexagonal with six pins. In the embodiment of FIG. 3, the pins insert into holes 38 that pass completely through the core plate 22 (i.e., through-holes 38). The through-holes 38 laterally position the fuel assemblies 20 during installation, and limit lateral movement of the fuel assemblies 20 during reactor operation. In some embodiments, the pins 40 have a clearance of approximately 10 thousandths of an inch with respect to the holes 38 in the lower core plate.

The core plate 22 includes flow channels (not shown) to allow the passage of primary coolant water upward through the core plate 22 and into the fuel assemblies 20. In the case of embodiments with through-holes 38 mating with the pins 40, the locating pins 40 are optionally hollow with openings to allow for additional primary coolant flow through the holes 38 and hollow pins 40. Alternatively, the pins may be solid.

Figure 4:
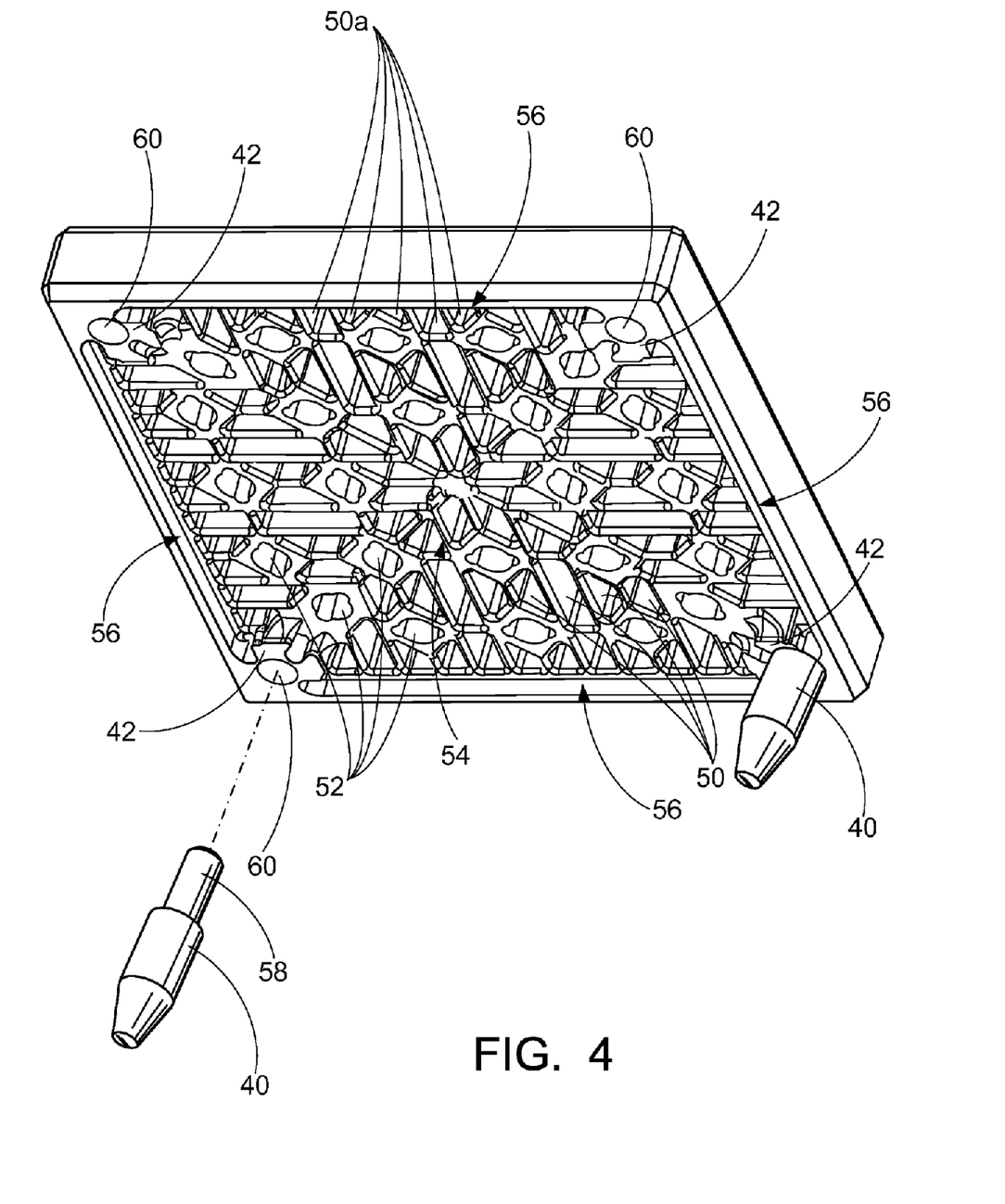
FIG. 4 is a perspective view of the bottom surface of the lower end fitting, with one locating pin shown installed, one locating pin shown in exploded view, and two locating pins omitted.

Referring to FIG. 4, the lower end fitting (LEF) 34 positions a fuel assembly 20 (see FIGS. 2-3) laterally on the core plate 22 (see FIGS. 2-3) using four locating pins 40. The four illustrative locating pins 40 are located on the four corners of the LEF to position the fuel assembly laterally by mating with receiving holes 38 in the lower core plate. The locating pins 40 provide lateral alignment for the fuel assembly 20, but the locating pins 40 are not load bearing pins and do not support the weight of the fuel assembly 20. The weight of the fuel assembly 20 is supported by load-bearing raised pads 42 of the lower end fitting 34. The illustrative LEF 34 has four pads 42 to support the weight of the fuel assembly 20 once it is installed in the core. After installation, the locating pins 40 prevent the fuel assembly 20 from moving laterally in the reactor core.

The lower end fitting (LEF) 34 is a substantially planar rectangular plate with a plurality of flow channels 50 and guide tube bosses 52. While the illustrative lower end fitting 34 is square, more generally the lower end fitting is sized and shaped to match the cross-section of the fuel assembly, e.g. a fuel assembly with a hexagonal cross-section preferably has a hexagonal LEF. In the embodiment shown in FIG. 4, a lower face or bottom surface 54 of the lower end fitting 34 (that is, the face that faces away from the fuel rods) includes a peripheral skirt 56 that is formed by raised edges running between adjacent corners along the perimeter of the rectangle. In the illustrative embodiment, the skirt 56 is the same height as the support pads 42 and joins with the support pads so as to form a peripheral boundary that block primary coolant from flowing in the gaps between adjacent LEFs of adjacent fuel assemblies.

With brief reference back to FIG. 2, in the fuel assembly 20, the fuel rods are held by the spacer grids 24, 26, which are welded to the guide tubes 30. The bottom ends of the guide tubes 30 are secured to the guide tube bosses 52 of the LEF 34. The spacer grids 24, 26, guide tubes 30, and end fittings 32, 34 thus form the structural cage of the fuel assembly 20, and the weight of the fuel assembly 20 is supported by the core plate 22 through the LEF 34 and more particularly by pads 42 of the LEF 34.

With continuing reference to FIG. 4, in the illustrative LEF 34 the locating pins 40 have fastening shafts 58 that insert into mounting holes 60 in the pads 42 of the LEF 34. (For illustrative purposes, FIG. 4 shows one locating pin 40 in an "exploded" view to reveal the shaft 58 of the pin, one locating pin 40 is shown installed, and the remaining two locating pins are omitted to reveal the mounting holes 60). The mounting shaft 58 of the locating pin 40 can be secured into the mounting hole 60 of the LEF 34 by welding, friction fit, a threaded connection, or another suitable mechanism. The illustrative mounting holes 60 are formed into the pads 42 which has the advantage of providing increased thickness for accommodating longer mounting shafts 58 to provide secure mounting of the locating pins 40. This arrangement also minimizes the occluded area of the LEF 34 so as to minimize the flow resistance imposed by the LEF 34. However, it is also contemplated to position the mounting holes for the locating pins elsewhere than at the load-bearing pads 42. (The flow occlusion in such an alternative design can be reduced by making the locating pins hollow with flow passages).

Figure 5:
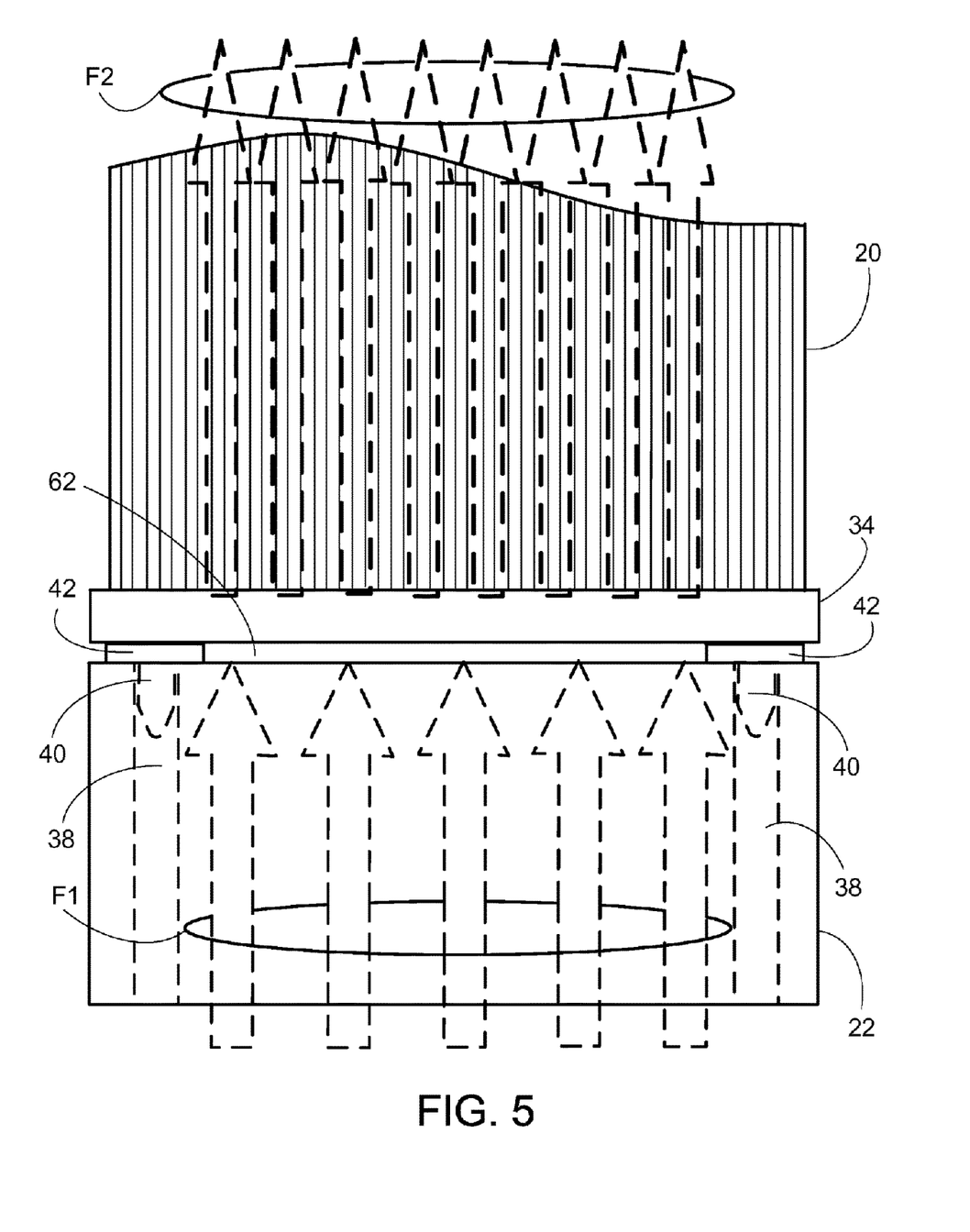
FIG. 5 is a diagrammatic side view of the lower portion of the fuel assembly resting on the lower core plate of the nuclear reactor.

With reference to FIG. 5, a diagrammatic side view of the installed fuel assembly 20 is shown. In FIG. 5, the locating pins 40 in the through-holes 38 of the lower core plate 22 are shown in phantom. The locating pins 40 insert into the holes 38 with a depth labeled LD in FIG. 5. This depth LD should be larger than the maximum credible lift of the fuel assembly 20 during normal operation or during a seismic event or other abnormal event that could cause lifting of the fuel assembly 20. The maximum credible lift is typically delineated by upper internals, e.g., the control rod guide frames 9 (see FIG. 1) or the like.

With continuing reference to FIG. 5, the raised weight bearing pads 42 of the LEF 34 define a gap or plenum 62 between the LEF 34 of the installed fuel assembly 20 and the lower core plate 22. This gap 62 advantageously provides a flow mixing plenum for transitioning upward primary coolant flow F1 through flow channels (not shown) of the lower core plate 22 into upward primary coolant flow F2 passing through the flow channels 50 of the LEF 34 and into the fuel assembly 20. The gap or plenum 62 defined by the raised weight-bearing pads 42 may, for example, allow flow channels of the lower core plate 22 that do not align laterally with the flow channels 50 of the LEF 34. Thus, the flow channels 50 of the LEF 34 can have a variety of shapes, with the illustrative flow channels 50 having generally trapezoidal, rhomboidal, or rectangular shapes. Some of the illustrative flow channels (e.g. those labeled 50a) have clipped trapezoid, clipped rhombus, or clipped rectangle shapes where the channels are clipped by the edge of the LEF. The detailed layout of the flow channels is chosen to provide a desired flow through the fuel assembly, with the gap or plenum 62 facilitating flow transfer from the lower core plate 22 into the LEF (i.e., lower nozzle) 34.

The locating pins 40 are optionally made of the same material as the LEF 34. This provides similar thermal expansion properties, anti-corrosion properties, and strength, and also facilitates welding the locating pins 40 to the LEF 34. However, the locating pins 40 and the LEF 34 may be made by different manufacturing processes. For example, the locating pins 40 may be made by machining a metal blank, whereas the LEF 34 may be a cast component. Moreover, different materials can be used for the locating pins 40 and the LEF 34, respectively, so long as the materials are sufficiently compatible chemically and in terms of thermal expansion.

With reference back to FIG. 4, the LEF 34 shown in FIG. 4 includes the peripheral skirt 56 that is formed by raised edges of the same height as and merging into the support pads 42. The skirt 56 advantageously forms a peripheral boundary that blocks primary coolant from flowing in the gaps between adjacent LEFs of adjacent fuel assemblies. This can be advantageous if, for example, a debris filter is incorporated into the lower end fitting. However, the flow restriction imposed by the skirt 56 compartmentalizes flow through the reactor core 2 so that flow passes through each fuel assembly 22 substantially independently. Here again, the gap or plenum 62 defined by the raised support pads 42 facilitates uniform flow through each fuel assembly 20.

Figure 6:
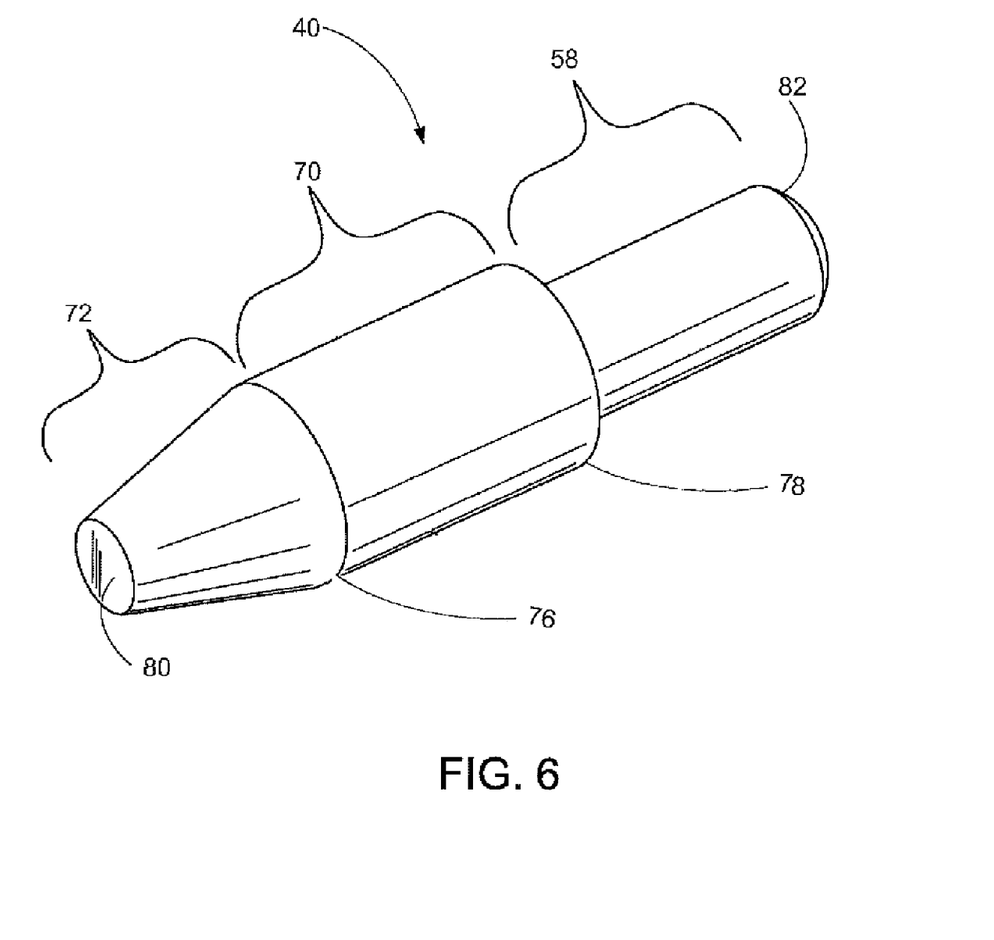
FIG. 6 is a perspective view of a locating pin.

FIG. 6 shows a perspective view of a locating pin 40. The locating pin includes a body 70, a chamfered tip 72, and the mounting shaft 58. The body 70 has a first end 76 and a second end 78. The chamfered tip 72 extends from the first end 76 of the body 70. The chamfered tip 72 has a frusto-conical shape and includes a flat end 80 opposite the body, or, said another way, the locating pin 40 tapers from the body 70 to the flat end 80. In the illustrative locating pin 40, the flat end 80 is parallel to the bottom surface of the LEF 34. The mounting shaft 58, which has a smaller diameter than the body, extends from the second end 78 of the body and is inserted into the mounting hole 60 of the LEF 34 (see FIG. 4). As can be seen, the intersection of the body and the mounting shaft defines an annular surface extending so as to form a step between the body and the mounting shaft. The shaft 58 may be slightly rounded at the end 82 to aid inserting the shaft 58 into the mounting hole 60. In the embodiment shown, the pin 40 is solid; however, the pin 40 may optionally be hollow to allow additional coolant flow there through.

The chamfered tip 72 accommodates some lateral positioning error when installing the fuel assembly 20 in the core 2 by guiding the locating pins 40 into the holes 38, in the lower core plate 22. The flat end 80 of the chamfered tip 72 provides strength and stability in case the assembly is inadvertently rested on the tip of the pin instead of the LEF pads 42. As discussed with reference to FIG. 5, the pins are long enough (i.e., length LD is large enough) to prevent the fuel assembly 20 from becoming dislodged during a seismic event or other credible fuel assembly lifting event, during which the fuel could be lifted off the core plate. The pins 40 are also removable for serviceability. The shaft 58 may be secured in the mounting hole 60 by welding, frictionally, threaded couplings (in which case the mounting shaft is suitably a threaded shaft and the mounting hole is suitably a threaded hole), or so forth. Alternatively, the locating pins may be integrally formed as part of the lower end fitting 34.

An advantage of the disclosed fuel assembly mounting arrangement is that if one or more of the locating pins 40 becomes damaged or bent during installation of the fuel assembly 20, the affected fuel assembly can be removed and the damaged pin replaced. There would be no need to remove additional fuel assemblies from the core or to repair the core plate. Likelihood of damage to the mounting holes 38, or to the support pads 42, is substantially lower than the likelihood of damage to the (removable) protruding pins 40, and so the system is robust against damage.

Although the illustrative lower end fitting configurations have been described with reference to an illustrative integral PWR (FIG. 1), the lower end fitting configurations as disclosed herein are suitably employed in conjunction with substantially any type of nuclear reactor, e.g., an integral PWR, a PWR with an external steam generator, a boiling water reactor (BWR), or so forth.

The present disclosure has been described with reference to exemplary embodiments. Obviously, modifications and alterations will occur to others upon reading and understanding the preceding detailed description It is intended that the present disclosure be construed as including all such modifications and alterations insofar as they come within the scope of the appended claims or the equivalents thereof.

The invention claimed is:

1. An apparatus comprising:
a lower end fitting of a fuel assembly of a nuclear reactor, the lower end fitting including:
a plate having flow channels to allow reactor primary coolant water to flow through the plate and having a bottom surface that includes a plurality of raised support pads defining a respective hole therein, and
a plurality of locating pins extending from the support pads, each of the locating pins being a unitary piece having a larger diameter body and a smaller diameter mounting shaft extending from one end of the body to define an annular surface at an intersection of the larger diameter body and the smaller diameter mounting shaft, the annular surface extending so as to form a step between the larger diameter body and the smaller diameter mounting shaft, the mounting shaft being secured in the respective hole such that the annular surface is fixed with respect to and engages from below a surface of an associated one of the support pads.

2. The apparatus of claim 1, wherein the plate is rectangular with four corners and the plurality of locating pins includes four locating pins, one locating pin being disposed at each corner of the plate.

3. The apparatus of claim 2, wherein the plurality of raised support pads include four raised support pads, one raised support pad at each corner of the plate.

4. The apparatus of claim 3, wherein each locating pin has a chamfered tip with a flat end that is substantially parallel to the bottom surface of the plate.

5. The apparatus of claim 1, wherein each locating pin has a chamfered tip with a flat end that is substantially parallel to the bottom surface of the plate, the mounting shaft extending opposite from the chamfered tip.

6. The apparatus of claim 5 wherein each locating pin is welded to the plate with the mounting shaft inserted into the hole in the plate.

7. The apparatus of claim 1 wherein the locating pins are hollow and define a flow passage.

8. The apparatus of claim 1 further comprising:
fuel rods comprising fissile material;
a plurality of guide tubes having lower ends connected with the lower end fitting;
a plurality of spacer grids welded to the guide tubes and holding the fuel rods; and
an upper end fitting connected with upper ends of the plurality of guide tubes;
wherein the fuel rods, plurality of guide tubes, plurality of spacer grids, upper end fitting,
and lower end fitting define a nuclear fuel assembly.

9. The apparatus of claim 8 further comprising:
a lower core plate having a plurality of holes configured to receive the plurality of locating pins extending from the support pads of the plate in order to laterally align the nuclear fuel assembly on the lower core plate.

10. The apparatus of claim 9 wherein the raised support pads of the lower end fitting of the nuclear fuel assembly rest on the lower core plate and bear the weight of the nuclear fuel assembly, the plurality of locating pins extending from the support pads of the plate not bearing the weight of the nuclear fuel assembly, there being a gap or plenum defined between the plate of the lower end fitting and the lower core plate by the raised support pads.

11. The apparatus of claim 9 wherein the plurality of holes of the lower core plate are through-holes.

12. The apparatus of claim 8 further comprising:
a pressure vessel containing a nuclear reactor core including the nuclear fuel assembly, the nuclear reactor core being supported by the lower core plate inside the pressure vessel.

* * * * *

UNITED STATES PATENT AND TRADEMARK OFFICE
CERTIFICATE OF CORRECTION

| | | |
|---|---|---|
| PATENT NO. | : 12,381,015 B2 | Page 1 of 1 |
| APPLICATION NO. | : 17/690306 | |
| DATED | : August 5, 2025 | |
| INVENTOR(S) | : Julius M. Ullmann et al. | |

It is certified that error appears in the above-identified patent and that said Letters Patent is hereby corrected as shown below:

In the Specification

In Column 6, Line 3, delete "labeled LD" and insert --labeled $L_D$--

In Column 6, Line 3, delete "depth LD" and insert --depth $L_D$--

In Column 7, Line 17, delete "length LD" and insert --length $L_D$--

Signed and Sealed this
Twentieth Day of January, 2026

John A. Squires
*Director of the United States Patent and Trademark Office*